Patented July 1, 1924.

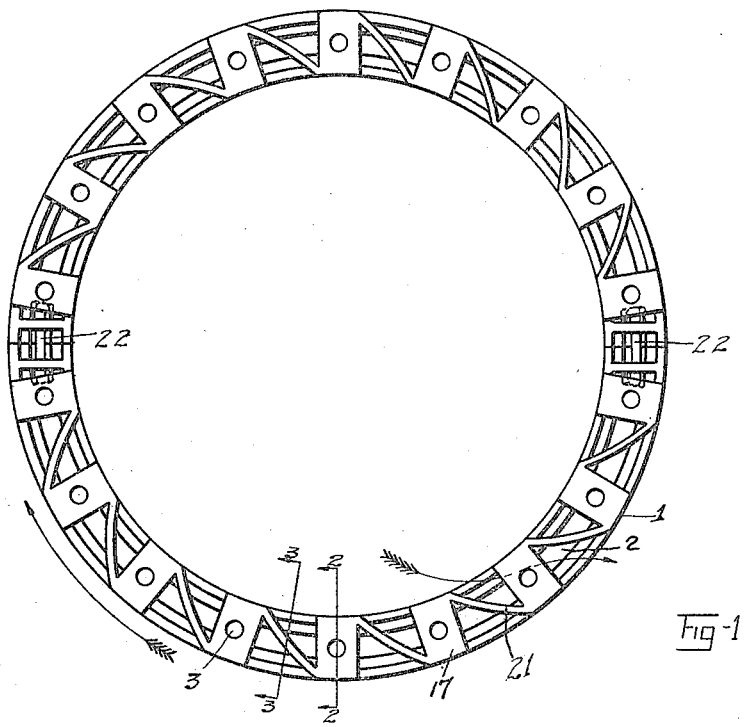

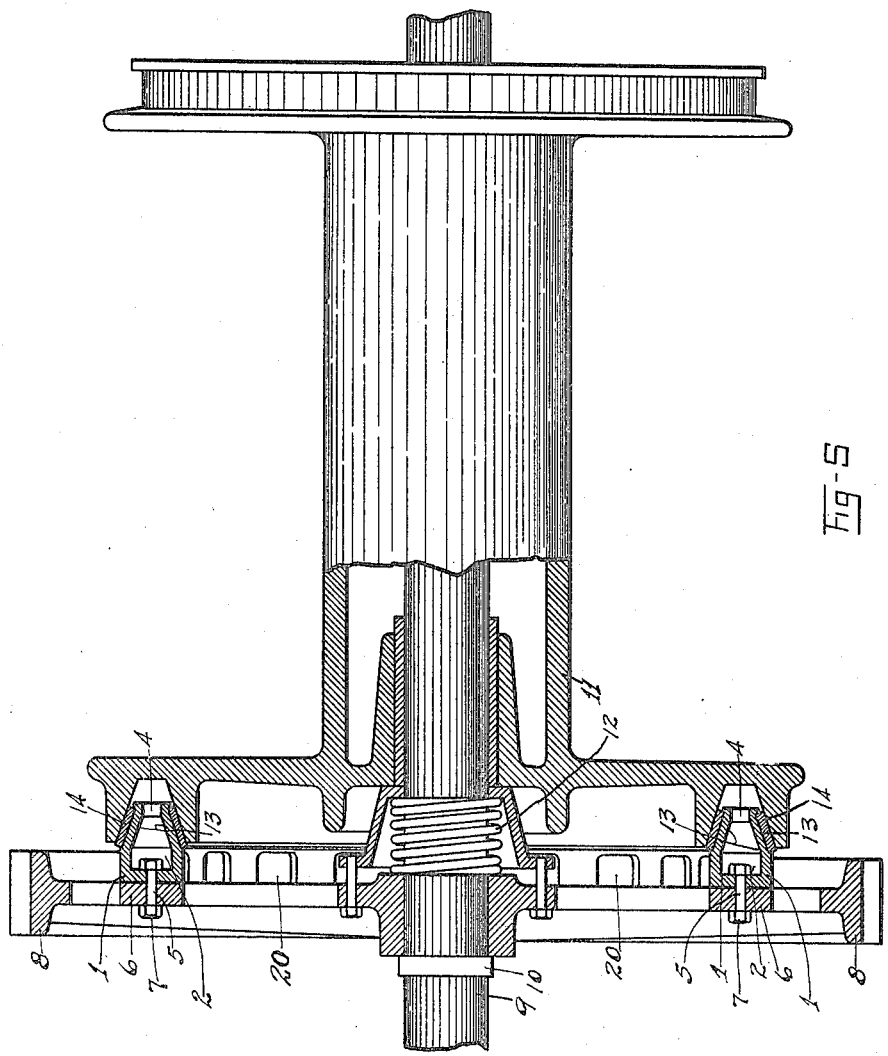

1,499,538

UNITED STATES PATENT OFFICE.

JAMES H. LA MOREE, OF PORTLAND, OREGON; WINNIE MAE LA MOREE, ADMINISTRATRIX, AND CHRISS A. BELL, ADMINISTRATOR, OF SAID JAMES H. LA MOREE, DECEASED, ASSIGNORS OF ONE-THIRD TO WINNIE MAE LA MOREE AND OF TWO-THIRDS TO WINNIE MAE LA MOREE, TRUSTEE FOR HENRY-ETTA MAE LA MOREE AND ANNA ELLEN LA MOREE.

FRICTION CLUTCH.

Application filed January 16, 1922. Serial No. 529,527.

*To all whom it may concern:*

Be it known that I, JAMES H. LA MOREE, a citizen of the United States, residing at Portland, in the county of Multnomah and State of Oregon, have invented new and useful Improvements in Friction Clutches, of which the following is a specification.

Friction clutches which are subjected to severe usage have more or less slipping resulting in excessive heat of the engaging surfaces. With some usage of friction clutches such slippage is necessary as a feature of the operation and under these conditions also there is excessive heat produced. The present invention is designed to cool the engaging surfaces in a simple and efficient manner. The invention as exemplified is particularly designed for use with a friction clutch driving a hoisting or logging engine drum.

The invention is illustrated in the accompanying drawings as follows:—

Fig. 1 shows a rear plan view of the skeleton on which the friction surfaces are formed.

Fig. 2 a section on the line 2—2 in Fig. 1.

Fig. 3 a section on the line 3—3 in Fig. 1.

Fig. 4 a front elevation of a fragment of the frame.

Fig. 5 a front elevation, partly in section, of a drum with the friction clutch in place thereon.

1 is a metal frame carrying the friction surfaces, 2 a chamber formed within the frame, 3 bolt openings through which bolts for securing the metal frame extend, 4 openings opposite the openings 3 permitting the insertion of the heads of the bolts, and 5 bolts for securing the metal frame to a web 6 on the wheel 8, the bolts being supplied with the clamping nuts 7. The wheel is journaled on a shaft 9 and a collar 10 is arranged to move the wheel to bring the friction surfaces into engagement in the usual manner to drive the drum 11. The clutch is released through the action of a spring 12.

The chamber 2 has the conically-shaped walls 13 on which there are grooves in which is pressed friction material 14 such as is commonly marketed as asbestos friction material, this being of uniform thickness and sufficiently flexible to conform to the conical surfaces of the frame and secured to the frame by means of rivets 15 preferably of copper or soft metal.

The metal frame is open at the rear except for the cross plates 17 in which are arranged the openings 3 and posts 16 and 18 extend from the plates 17 to the conical walls 13, the spaces between the posts forming openings 19 and 20 on the inner and outer peripheries of the frame. Inclined deflecting fan blades 21 extend from the posts 18 at the inner periphery to the next succeeding posts 16 on the outer periphery. The fan blades also extend into the chamber between the walls 13 but not to the full depth of the chamber so that there is an opportunity for air to pass over the blades in contact with the walls 13.

As the metal frame is rotated in the direction of the circumferentially directed arrow in Fig. 1 air is drawn into the openings 20 and through the influence of centrifugal force and the action of the next succeeding blade is thrown out through the openings 19 as indicated by the arrow in Fig. 1. Thus a current of air is forced through the metal frame and in contact with the walls carrying the friction surfaces so that these surfaces are cooled. This cooling action not only continues during the engagement of the clutch but inasmuch as the wheel 8 is ordinarily rotated when disengaged the air current is continued while the clutch is disengaged so that the cooling effect is also continued. Preferably the frame is formed in two sections. As shown it is formed in two segments which are bolted together by bolts 22.

What I claim as new is:—

1. In a friction clutch, the combination of a hollow metal frame having on its inner and outer walls converging conically-shaped friction surfaces; and means for forcing a current of air through the frame between the walls.

2. In a friction clutch, the combination of a hollow metal frame having on its inner and outer walls converging conically-shaped friction surfaces; and means comprising fan blades within the frame for forcing a current of air through the frame between the walls.

3. In a friction clutch, the combination of an annular hollow metal frame having axially extending converging conically-shaped friction surfaces on its inner and outer walls and openings on its inner periphery communicating with the hollow frame; and means inducing a flow of air to the frame through said openings.

4. In a friction clutch, the combination of an annular hollow metal frame having axially extending converging conically-shaped friction surfaces on its inner and outer walls and openings on its inner periphery communicating with the hollow frame; and means inducing a flow of air to the frame through said openings comprising fan blades within the frame.

5. In a friction clutch, the combination of an annular hollow metal frame having outwardly faced friction surfaces and openings on its inner periphery; and means inducing a flow of air to the frame through said openings and conducting the same circumferentially within the frame.

6. In a friction clutch, the combination of an annular hollow metal frame having axially extending converging conically-shaped friction surfaces on its inner and outer walls and communicating openings on its inner and outer periphery inducing a flow of air through the frame.

7. In a friction clutch, the combination of an annular hollow metal frame having axially extending converging conically-shaped friction surfaces on its inner and and outer walls and communicating openings on its inner and outer periphery; and fan blades within the frame inducing a current of air through the inner openings and discharging the same through the outer openings.

8. In a friction clutch, the combination of an annular hollow metal frame having outwardly faced friction surfaces and connecting openings on its inner and outer periphery; and fan blades within the frame inducing a current of air through the inner openings and discharging the same through the outer openings, said blades being inclined to direct the air circumferentially along the frame.

9. In a friction clutch, the combination of a hollow frame having walls supporting conically shaped friction surfaces; perforated cross plates for securing the frame; posts extending from the cross plates to the walls carrying the friction surfaces; spaces between the posts forming openings to the interior of the frame; and fan blades extending from an inner post to the next adjacent outer post.

10. In a friction clutch, the combination of a hollow frame having walls supporting conically shaped friction surfaces; perforated cross plates for securing the frame; posts extending from the cross plates to the walls carrying the friction surfaces; spaces between the posts forming openings to the interior of the frame; and fan blades extending from an inner post to the next adjacent outer post, said fan blades being of less depth than the interior of the frame.

In testimony whereof I have hereunto set my hand.

JAMES H. LA MOREE.